United States Patent
Ma et al.

(10) Patent No.: US 10,088,941 B2
(45) Date of Patent: Oct. 2, 2018

(54) TOUCH CONTROL SUBSTRATE AND DISPLAY DEVICE

(71) Applicants: BOE Technology Group Co., Ltd., Beijing (CN); HEFEI Xinsheng Optoelectronics Technology Co., Ltd, Hefei (CN)

(72) Inventors: Tao Ma, Beijing (CN); Wenjie Shi, Beijing (CN); Yinhu Huang, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 14/914,708

(22) PCT Filed: Sep. 25, 2015

(86) PCT No.: PCT/CN2015/090742
§ 371 (c)(1),
(2) Date: Feb. 26, 2016

(87) PCT Pub. No.: WO2016/150133
PCT Pub. Date: Sep. 29, 2016

(65) Prior Publication Data
US 2017/0038890 A1    Feb. 9, 2017

(30) Foreign Application Priority Data
Mar. 20, 2015 (CN) .......................... 2015 1 0125435

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

| 6,163,313 A * | 12/2000 | Aroyan ................... G06F 3/045 178/18.04 |
| 2009/0084613 A1 * | 4/2009 | Yang ........................ G06F 3/044 178/18.06 |

(Continued)

FOREIGN PATENT DOCUMENTS

| CN | 101520708 A | 9/2009 |
| CN | 103019496 A | 4/2013 |

(Continued)

OTHER PUBLICATIONS

Nov. 30, 2015—(WO)—International Search Report and Written Opinion Appn PCT/CN2015/090742 with English Tran.

(Continued)

*Primary Examiner* — Matthew Yeung
(74) *Attorney, Agent, or Firm* — Banner & Witcoff, Ltd.

(57) ABSTRACT

A touch control substrate and a display device. The touch control substrate includes a plurality of touch control electrodes for touch controlling, which are made of electric conductive material. The touch control electrodes are disposed in a same layer and intervals are provided between adjacent touch control electrodes. The touch control panel further comprises a vanishing layer, only disposed at the intervals between the adjacent touch control electrodes and edges of each of the touch control electrodes. The vanishing layer is made of transparent insulation material. The touch (Continued)

control substrate and the display device can provide good vanishing effects and have simple manufacturing processes.

20 Claims, 2 Drawing Sheets

(56) References Cited

U.S. PATENT DOCUMENTS

| | | | | |
|---|---|---|---|---|
| 2009/0244028 A1* | 10/2009 | Matsuo | ............... | G06F 3/044 345/174 |
| 2010/0066702 A1* | 3/2010 | Lee | ............... | G06F 3/044 345/174 |
| 2010/0295819 A1* | 11/2010 | Ozeki | ............... | G06F 3/044 345/174 |
| 2011/0226726 A1 | 9/2011 | Song et al. | | |
| 2013/0181944 A1* | 7/2013 | Lee | ............... | G06F 3/044 345/174 |
| 2015/0029142 A1* | 1/2015 | Kim | ............... | G06F 3/044 345/174 |
| 2015/0060125 A1* | 3/2015 | Stevenson | ............... | G06F 3/044 174/261 |
| 2015/0068883 A1* | 3/2015 | Chi | ............... | G06F 3/044 200/5 R |
| 2015/0181716 A1* | 6/2015 | Jaw | ............... | G06F 3/044 216/13 |
| 2015/0199043 A1* | 7/2015 | Park | ............... | G06F 3/044 345/174 |

FOREIGN PATENT DOCUMENTS

| | | |
|---|---|---|
| CN | 203338323 U | 12/2013 |
| CN | 203812218 | 9/2014 |
| CN | 104090675 A | 10/2014 |
| CN | 204009807 U | 12/2014 |
| CN | 204087173 | 1/2015 |
| CN | 204166518 U | 2/2015 |
| CN | 104679340 A | 6/2015 |
| KR | 20130086498 A | 8/2013 |

OTHER PUBLICATIONS

Aug. 10, 2017—(CN) Second Office Action 201510125435.3 with English Tran.
Mar. 31, 2017—(CN) First Office Action Appn 201510125435.3 with English Tran.

* cited by examiner

TOUCH CONTROL SUBSTRATE AND DISPLAY DEVICE

The application is a U.S. National Phase Entry of International Application No. PCT/CN2015/090742 filed on Sep. 25, 2015, designating the United States of America and claiming priority to Chinese Patent Application No. 201510125435.3 filed on Mar. 20, 2015. The present application claims priority to and the benefit of the above-identified applications and the above-identified applications are incorporated by reference herein in their entirety.

TECHNICAL FIELD

At least one embodiment of the present invention relate to a touch control substrate and a display device.

BACKGROUND

OGS (On Glass Solution) touch controlling refers to a technology of providing a touch control electrode on a protection plate outside a display panel. That is, the protection plate has protection effects while it functions as a touch control substrate, and thus it makes a structure of the display device simple.

SUMMARY

Embodiments of the invention provides a touch control substrate and a display device, which can provide good vanishing effects and have simple manufacturing processes.

An embodiment of the invention provides a touch control substrate. The touch control substrate comprises a plurality of touch control electrodes for touch controlling, which are made of transparent conductive material, the touch control electrodes are disposed in a same layer and intervals are provided between adjacent touch control electrodes. The touch control substrate further comprises a vanishing layer, disposed only at the interval of the adjacent touch control electrodes and edges of each of the touch control electrodes, and the vanishing layer is made of transparent insulation material.

In this disclosure, "touch control electrodes" refers to electrodes for achieving touch controlling. They can be a plurality of electrodes of a same type and can comprise a plurality of electrodes of different types and different structures.

"Disposing in a same layer" refers to the touch control electrodes being made of a same material layer, and thus they are disposed in a same position from view of a stack relationship. However, it does not mean that the touch control electrodes have a same distance from the substrate necessarily.

"a vanishing layer, only disposed at the interval between the adjacent touch control electrodes and edges of each of the touch control electrodes" refers to that a portion of the vanishing layer is located at the interval between adjacent touch control electrodes, and another portion of the vanishing layer is located at the edges of each of the touch control electrodes and is overlapped with the touch control electrode. Above description only indicates projections of the vanishing layer and the touch control electrodes on the substrate comply with the above-mentioned position relationship. It does not mean that the vanishing layer and the touch control electrodes are disposed in a same layer, and it also does not mean that both of them necessarily are in contact with each other directly.

For example, the vanishing layer is made of transparent resin material. A thickness of the vanishing layer is from 1 micrometer to 2.5 micrometers.

For example, the vanishing layer is made of transparent inorganic insulation material. The thickness of the vanishing layer is from 0.08 micrometer to 0.15 micrometer.

For example, a width of the vanishing layer located at the edges of the touch control electrode is from 5 micrometers to 50 micrometers.

For example, a width of the interval of the adjacent touch control electrodes is from 25 micrometers to 40 micrometers.

For example, the vanishing layer located on the edges of the touch control electrode is provided above the touch control electrode.

For example, the touch control electrode comprises a plurality of first electrodes and a plurality of second electrodes which intersect with each other; each of the first electrodes is a continuous strip; each of the second electrode is formed of a plurality of second electrode sheets which are separated and located between the first electrodes, adjacent second electrode sheets are connected by a metal bridge, and the vanishing layer is disposed between the metal bridge and the first electrodes.

For example, the vanishing layer is made of transparent resin material.

For example, the first electrode is a sensing electrode, and the second electrode is a scan electrode; or the first electrode is the scan electrode, and the second electrode is the sensing electrode.

Another embodiment of the invention provides a display device, comprising the above-mentioned touch control substrate.

For example, the display device further comprises a display panel, and the touch control panel is provided on a light-emitting side of the display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Figure 1:
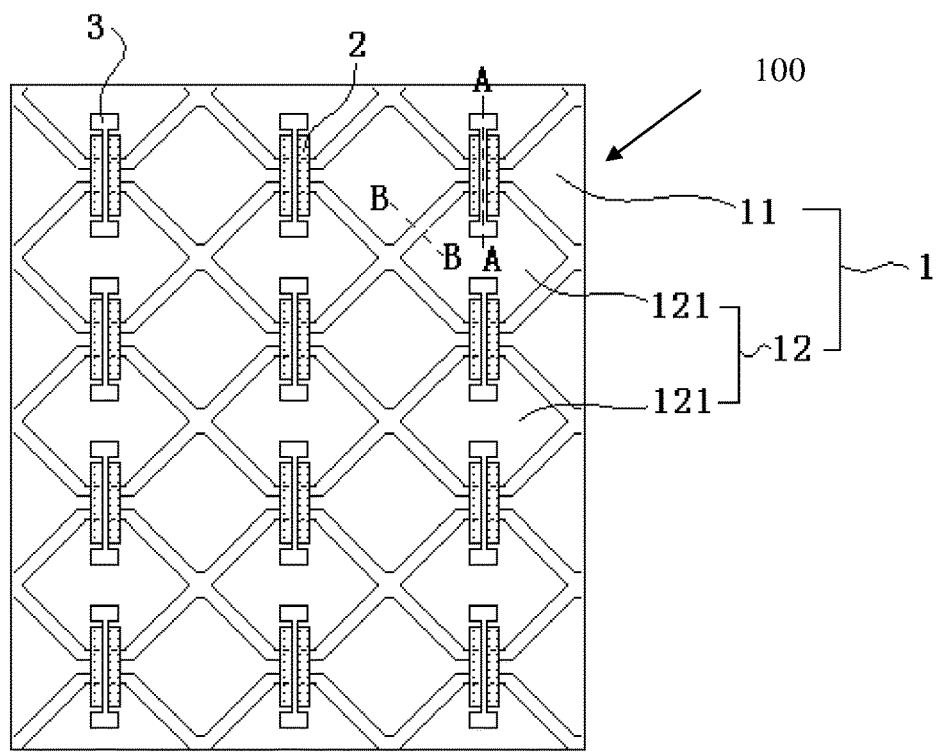
FIG. 1 is a structural schematic diagram of a top view of a touch control substrate.
Figure 2:
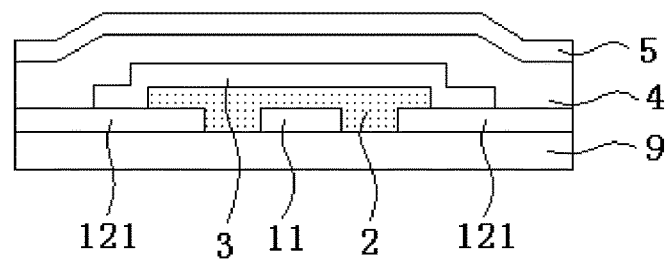
FIG. 2 is a structural schematic diagram of a portion of a cross-section along line AA of FIG. 1.
Figure 3:
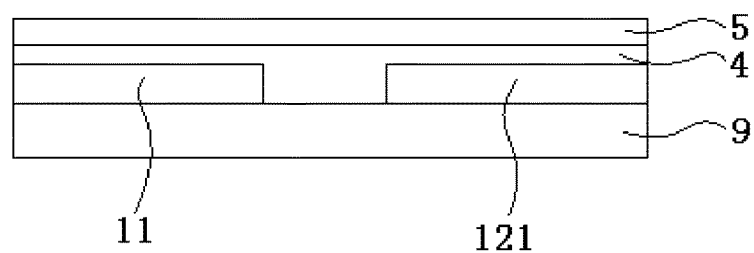
FIG. 3 is a structural schematic diagram of a portion of a cross-section along line BB of FIG. 1.

As shown in FIGS. 1-3, a substrate 9 of a touch control substrate has touch control electrodes 1 disposed thereon, and the touch control electrodes 1 are disposed in a same layer and are made of transparent conductive material (for example, indium tin oxide, i.e. ITO) and are provided at intervals. A touch control electrode 1 can comprise a scan electrode (a second electrode 12) and a sensing electrode (a first electrode 11), and the sensing electrode is strip-shaped. Each of scan electrodes consists of a plurality of scan electrode sheets (second electrode sheets 121) located between the sensing electrodes. The adjacent scan electrode sheets are connected by a metal bridge 3 across the sensing electrode. The metal bridge 3 and the sensing electrode are isolated by an insulation layer 2. Because indium tin oxide has a large resistivity, a thickness of the touch control electrode 1 described above is large in order to lower a resistance of the touch control electrode, especially for the touch control substrate having a large size. Although the indium tin oxide is transparent, it is different from air after all, and thus, when a thickness of the touch control electrode is large, it is can be seen from outside, which impacts on displaying. Accordingly, a vanishing layer 4 which is made of transparent inorganic insulation material, such as silicon dioxide and the like, is further provided on the insulation layer 2 and the metal bridge 3, to cover the entire substrate, so as to reduce visibility of the touch control electrode 1 by refractive index matching effects (i.e., vanishing). If vanishing effects of the vanishing layer 4 is not satisfying, an overcoat (OC) 5 can be further provided to cover the touch control substrate. The overcoat 5 is made of transparent organic material, such as resin and the like, which has vanishing effects. However, the vanishing effects of the vanishing layer 4 and the overcoat 5 described above is still not satisfying, and they need to be fabricated separately. It makes a manufacturing process and a structure of the touch control substrate complicated. Embodiments of the invention provide a touch control substrate and a display device which can provide good vanishing effects and have simple manufacturing process.

First Embodiment

Figure 4:
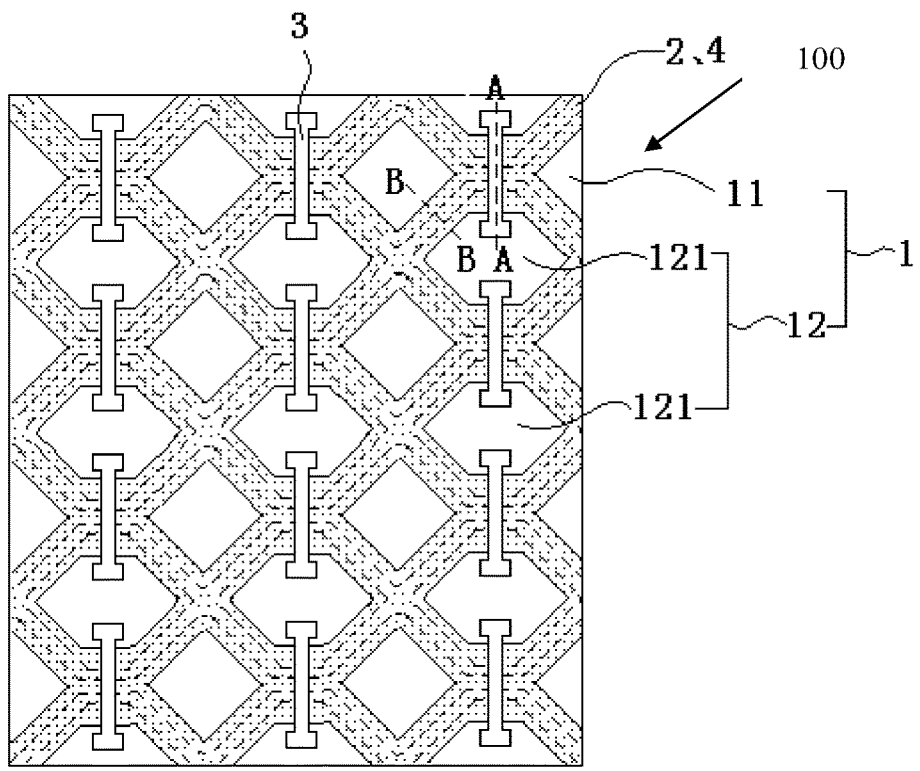
FIG. 4 is a structural schematic diagram of a top view of the touch control substrate according to an embodiment of the invention.
Figure 5:
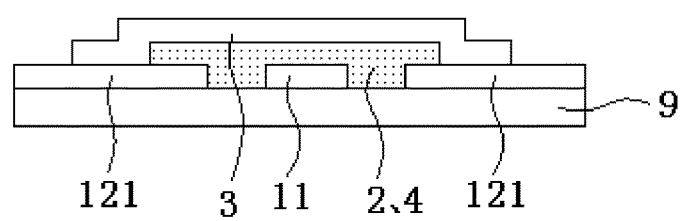
FIG. 5 is a structural schematic diagram of a portion of a cross-section along line AA of FIG. 4.
Figure 6:
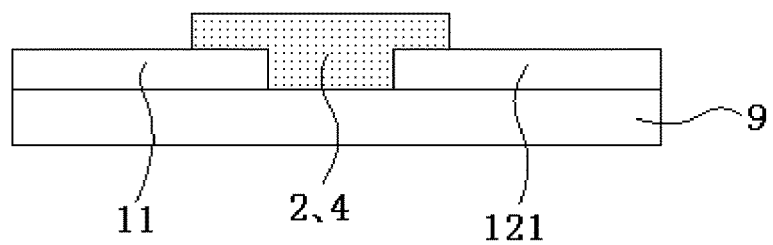
FIG. 6 is a structural schematic diagram of a portion of a cross-section along line BB of FIG. 4.

As shown in FIGS. 4-6, the embodiment of the invention provides a touch control substrate.

The touch control substrate is a touch control substrate of OGS mode. That is, touch control structures including touch control electrodes 1 and the like are located in the touch control substrate, and the touch control substrate can be disposed outside a display panel, while it functions as a protection plate of the display panel.

The touch control substrate comprises a plurality of touch control electrodes 1 for touch controlling, which are made of transparent conductive material, and the touch control electrodes 1 are disposed in a same layer, and the adjacent touch control electrodes 1 are disposed at intervals.

That is, the touch control electrodes 1 are disposed in the touch control substrate for achieving touch control function. These touch control electrodes 1 can be made of transparent conductive material (for example, indium tin oxide), for allowing light transmission. Meanwhile, the touch control electrodes 1 are disposed in a same layer. And, because the touch control electrodes 1 are disposed in the same layer, the touch control electrode can not be in contact with each other to prevent mutual conduction. Therefore, the intervals are provided between adjacent touch control electrodes necessarily. In other words, projections of the touch control electrodes 1 on the substrate 9 of the touch control substrate are not overlapped with each other.

"Disposing in a same layer" in the disclosure of the invention refers to the touch control electrodes 1 being made of a same material layer. Therefore, they belong to a same layer from view of stack relationship. However, it does not mean they have a same distance from the substrate 9 necessarily.

The touch control substrate of the embodiment further comprises a vanishing layer 4 which is disposed at an interval between adjacent touch control electrodes 1 and edges of each touch control electrode 1. The vanishing layer 4 is made of transparent insulation material.

That is, the vanishing layer 4 which is transparent and insulated is further provided in the touch control substrate. A portion of the vanishing layer 4 is located at the interval between adjacent touch control electrodes 1, and another portion of the vanishing layer 4 is located at the edges of each touch control electrode 1 and is overlapped with the touch control electrode 1. In other words, a projection of the vanishing layer 4 on the substrate 9 should fills out gaps between projections of the touch control electrodes 1 on the substrate 9, and meanwhile the projection of the vanishing layer 4 on the substrate 9 is also partially overlapped with projections of the edges of the touch control electrodes 1 on the substrate. Of course, it should be noted that above description does not mean that the vanishing layer 4 and the touch control electrodes 1 are disposed in a same layer, and it also does not mean that both of them should be in contact with each other directly, either.

After studying, compared with a vanishing layer which covers the entire substrate, the vanishing layer 4 according to the embodiment can provide better vanishing effects. This is because visual effects of the touch control electrodes 1 are mainly caused by their edges. That is, at a boundary between a side having the touch control electrode 1 and a side having no touch control electrode 1 (that is, the edge of the touch control electrode 1), the boundary can be seen easily, because structures of the two sides of the edge of the touch control electrode 1 are different from each other and a difference of their transmittivity and a difference of their refractive indexes are large. But the structures in the touch control electrode 1 are the same, therefore it cannot be easily seen. The vanishing layer 4 is distributed over gaps of the touch control electrode and the edge of the touch control electrode. That is, the vanishing layer 4 is located on both sides of the edge (the boundary described above) of the touch control electrode 1, so as to reduce the difference of the transmittivity of both sides of the edge of the touch control electrode 1 and the difference of the refractive indexes of both sides of the edge of the touch control electrode 1. It makes the edge of the touch control electrode 1 not be seen easily, so as to achieve good vanishing effects.

For example, portions of the vanishing layer 4 overlapped with the touch control electrode 1 are located above the touch control electrode 1.

That is, in view of a stack relationship, the vanishing layer 4 is located above the touch control electrode 1, rather than under the touch control electrode 1, so that portions of the vanishing layer 4, which are overlapped with the touch control electrode 1, are necessarily farther away from the substrate than the touch control electrode 1. Of course, the portions of the vanishing layer 4, which are overlapped with the touch control electrode 1, can be provided on the touch control electrode 1 directly (i.e., they can be in contact with the touch control electrode 1 directly). Alternatively, other structures can be provided on the touch control electrode 1 and the vanishing layer 4 is located above the structures.

Generally, a thickness of the touch control electrode 1 is thin and electrical conductivity should be ensured, therefore, the above structures are designed so that a structure under the touch control electrode 1 should be as smooth and uniform as possible, to prevent the touch control electrode 1 from breakage. The vanishing layer 4 being provided above the touch control electrode 1 can ensure the structure under the touch control electrode 1 to be more smooth and uniform.

Of course, the portions of the vanishing layer 4, which are overlapped with the touch control electrodes 1 can be located under the touch control electrode 1.

For example, a width of a gap between two adjacent touch control electrodes 1 is from 25 micrometers to 40 micrometers. For example, a width of the vanishing layer 4, which is located on the edge of the touch control electrode 1, is from 5 micrometers to 50 micrometers. That is, a width of a portion of the vanishing layer 4, which is overlapped with each side of the touch control electrode 1 is from 5 micrometers to 50 micrometers.

After study, when sizes of the vanishing layer 4 and the touch control electrode 1 comply with above-mentioned ranges, it can achieve better vanishing effects.

For example, as one implementation of the embodiment, the touch control electrode 1 comprises a plurality of first electrodes 11 and a plurality of second electrodes 12 which intersect with each other, and each of the first electrodes 11 is a continuous strip, as shown in FIGS. 4-6. Each of the second electrodes 12 is formed of a plurality of second electrode sheets 121 which are provided separately and located between the first electrodes 11. Adjacent second electrode sheets 121 are connected by a metal bridge 3. The vanishing layer 4 is disposed between the metal bridge 3 and the first electrodes 11.

That is, as shown in FIG. 4, the touch control electrodes 1 can be separated into two kinds of electrodes which intersect with each other. For example, the first electrodes 11 are strip-shaped (transverse distributed in the figure). Because these two kinds of electrodes are disposed in a same layer and are not in contact with each other, the first electrodes 11 can separate each of the second electrodes 12 into multiple of portions (the second electrode sheets 121) which are isolated from each other. These second electrode sheets 121 can be connected by a metal bridge 3 across the first electrodes 1. The metal bridge 3 can be made of metal, such as titanium, molybdenum or the like. An insulation layer 2 is provided between the metal bridge 3 and the first electrode 11 in order to prevent the metal bridge 3 from being in contact with the first electrode 11. In the embodiment, the insulation layer 3 can be the vanishing layer 4 described above. Of course, the insulation layer 2 (vanishing layer 4) in this case is not only located on the metal bridge 3, but may be also located on the gaps and the edges of the touch control electrode 1.

As it can be seen, for example, the vanishing layer 4 also being taken as the insulation layer 2 has following advantages: the insulation layer 2 is an inherent necessary structure for the touch control electrode 1 described above. Therefore, it is not necessary to add an additional step of forming the vanishing layer 4 separately, and only a pattern of the insulation layer 2 needs to be changed, so as to simplify the manufacturing process.

For example, the vanishing layer 4 is made of transparent resin material, and its thickness is from 1 micrometer to 2.5 micrometers.

That is, the vanishing layer (insulation layer 2) can be made of common resin material, such as epoxy resin, acrylic resin, or the like. In one aspect, this is because the insulation layer 2 in prior art is almost fabricated by transparent resin material, and if its material remains still, it is advantageous to unity the process. In the other aspect, in patterning, the resin material can be developed directly after being exposed, and etching is not necessary, so its manufacturing process is relatively simple. When the vanishing layer 4 is made of transparent resin material, the vanishing layer 4 should be thicker, and the thickness is usually between 1 micrometer and 2.5 micrometers.

For example, as another implementation of the invention, the vanishing layer 4 also can be made of transparent inorganic insulation material, and its thickness is between 0.08 micrometer and 0.15 micrometer.

That is, the vanishing layer 4 can be made of conventional transparent inorganic material, for example, silicon oxide, silicon nitride, silicon oxynitride or the like. When the vanishing layer 4 is made of the inorganic material, it can be relatively thinner. The thickness is about from 0.08 micrometer to 0.15 micrometer.

For example, as shown in FIG. 4, as described above, the metal bridge 3 and the vanishing layer 4 are provided above the first electrode 11, to ensure the bottom of the first electrode 11 is smooth and uniform.

For example, the first electrodes 11 are sensing electrodes and the second electrodes 12 are scan electrodes.

That is, scan signals can be applied to respective second electrodes 12 in turn. Capacitors are generated between adjacent portions of the first electrode 11 and the second electrodes 12. Therefore, so induction signals may be generated on the first electrodes 11. When a touch is made, a capacitance between the first electrode 11 and the second electrode 12 at the place of the touch is changed and the induction signal on the corresponding second electrode 12 is also changed, so that a touch position can be determined, to achieve touch controlling.

Of course, if the first electrodes 11 are the scan electrodes and the second electrodes 12 are the sensing electrodes, it may also work, provided that signals in the electrodes are changed correspondingly.

Of course, the above description is only a particular implementation of the touch control electrodes 1, and the touch control electrodes 1 also can have other known structures. For example, the touch control electrodes 1 can be sheet-shaped, and can be formed as an array on the substrate. Each of the touch control electrodes 1 is connected to a drive chip by wirings directly and can generate an independent induction signal (induction between the touch control electrode and a touch finger, also referred as "self-capacitance") for driving.

Of course, the touch control substrate also can have other known structures such as a buffer layer, a black matrix, wirings, or the like. Description of which will be omitted herein.

Second Embodiment

The embodiment of the invention provides a display device, which comprises the touch control substrate mentioned-above.

For example, the display device further comprises a display panel for displaying, and the touch control substrate is provided on a light-emitting side of the display panel. The display panel can be a liquid crystal display panel, organic light emitting diode display panel, electronic paper display panel, or the like.

That is, the touch control panel is of above-mentioned OGS mode, for example, so that it can be provided outside the display panel. In this case, the touch control panel not only can achieve touch control function, but also can be a protection plate which protects the display panel.

The display device of the embodiment can be a liquid crystal display device, an OLED display device, a cell phone, a tablet, a television set, a display, a notebook, a digital photo frame, a navigator and other products that have display function and touch control function.

In the touch control substrate of the display device according to at least one embodiment of the invention, the vanishing layers are only located at intervals of the electrodes and the edges of the electrodes, rather than covering the entire touch control substrate. Inventors of the application find that the edges of the touch control electrodes are obvious in vision. That is, "a side having the electrode" and "a side having no electrode" of the boundary have different structures, so a difference of the visual effects of both sides is large, such that the boundary can be easily seen. Therefore, as long as the vanishing layer of the invention is distributed on both sides of the boundary, a difference of the transmissions of the both sides of the boundary and a difference of the refractive indexes of the both sides of the boundary can be reduced, so that the boundary will be made non-obvious, for achieving better vanishing effects. In addition, the above-mentioned vanishing layer also can function as an insulation layer between the metal bridge and the electrode, so additional processes will not be added, such that the manufacturing method and the structure are simple and the cost is low.

It should be understood that above-mentioned embodiments are merely exemplary embodiments of the invention for illustrating principles of the invention, and the invention is not limited to this. It is obviously for those skilled in this art that any change or variation can be made to the embodiments without a departure from the spirit and scope of the invention. As such, these changes or variations are intended to be included within the invention.

This application claims the priority of Chinese Patent Application No. 201510125435.3 filed on Mar. 20, 2015, which is hereby incorporated entirely herein by reference.

The invention claimed is:

1. A touch control substrate, comprising:
   a plurality of touch control electrodes configured for touch controlling, made of transparent conductive material, wherein the touch control electrodes are disposed in a same layer and intervals are provided between adjacent touch control electrodes; and
   a vanishing layer,
   insulating layer,
   wherein, the vanishing layer is made of transparent insulation material and disposed on the insulating layer,
   wherein, the vanishing layer and the insulating layer are only disposed at a first place and a second place, the first place is intervals between the adjacent touch control electrodes, and the second place is edges of each of the touch control electrodes.

2. The touch control substrate of claim 1, wherein the vanishing layer is made of transparent resin material.

3. The touch control substrate of claim 2, wherein a thickness of the vanishing layer is from 1 micrometer to 2.5 micrometers.

4. The touch control substrate of claim 1, wherein the vanishing layer is made of transparent inorganic insulation material.

5. The touch control substrate of claim 4, wherein a thickness of the vanishing layer is from 0.08 micrometer to 0.15 micrometer.

6. The touch control substrate of claim 1, wherein a width of the vanishing layer located at the edges of the touch control electrodes is from 5 micrometers to 50 micrometers.

7. The touch control substrate of claim 1, wherein a width of the intervals of the adjacent touch control electrodes are from 20 micrometers to 40 micrometers.

8. The touch control substrate of claim 1, wherein the vanishing layer located on the edges of the touch control electrodes is provided above the touch control electrodes.

9. The touch control substrate of claim 1, wherein the touch control electrodes comprise a plurality of first electrodes and a plurality of second electrodes, which intersect with each other;
   each of the first electrodes is a continuous strip;
   each of the second electrodes is formed of a plurality of second sheet which are separated and located between the first electrodes, adjacent second electrode sheets are connected by a metal bridge, and the vanishing layer is disposed between the metal bridge and the first electrodes.

10. The array substrate of claim 1, wherein
    the first electrodes are sensing electrodes, and the second electrodes are scan electrodes; or
    the first electrodes are the scan electrodes, and the second electrodes are the sensing electrode.

11. A display device, comprising a touch control substrate, wherein the touch control substrate is the touch control substrate of claim 1.

12. The display device of claim 11, further comprising a display panel, wherein the touch control panel is provided on a light-emitting side of the display panel.

13. The touch control substrate of claim 2, wherein the thickness of the vanishing layer located at the edges of the touch control electrodes is from 5 micrometers to 50 micrometers.

14. The touch control substrate of claim 2, wherein a width of the intervals of the adjacent touch control electrodes are from 20 micrometers to 40 micrometers.

15. The touch control substrate of claim 2, wherein the vanishing layer located on the edges of the touch control electrodes is provided above the touch control electrodes.

16. The touch control substrate of claim 2, wherein the touch control electrodes comprise a plurality of first electrodes and a plurality of second electrodes, which intersect with each other;
    each of the first electrodes is a continuous strip;
    each of the second electrodes is formed of a plurality of second electrode sheets which are separated and located between the first electrodes, adjacent second electrode sheets are connected by a metal bridge, and the vanishing layer is disposed between the metal bridge and the first electrodes.

17. The array substrate of claim 2, wherein
    the first electrodes are sensing electrodes, and the second electrodes are scan electrodes; or
    the first electrodes are the scan electrode, and the second electrodes are the sensing electrode.

18. The touch control substrate of claim 3, wherein the thickness of the vanishing layer located at the edges of the touch control electrodes is from 5 micrometers to 50 micrometers.

19. The touch control substrate of claim 3, wherein a width of the intervals of the adjacent touch control electrodes are from 20 micrometers to 40 micrometers.

20. The touch control substrate of claim 3, wherein the vanishing layer located on the edges of the touch control electrodes is provided above the touch control electrodes.

\* \* \* \* \*